United States Patent Office 3,535,406
Patented Oct. 20, 1970

3,535,406
PHOSPHORUS-CONTAINING DIOLS AND A METHOD OF MAKING THEM
Herbert Jenkner, Cologne-Deutz, Germany, assignor to Chemische Fabrik Kalk G.m.b.H., Cologne-Kalk, Germany
No Drawing. Filed Dec. 2, 1965, Ser. No. 511,224
Claims priority, application Germany, Dec. 10, 1964, C 34,609
The portion of the term of the patent subsequent to Dec. 23, 1986, has been disclaimed
Int. Cl. C07d 1/00; C07f 9/38; C08f 45/58
U.S. Cl. 260—932
5 Claims

ABSTRACT OF THE DISCLOSURE

Phosphorus-containing diols of the formula

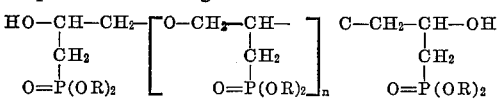

in which R is selected from the group consisting of saturated aliphatic hydrocarbon radicals, chlorine-substituted saturated aliphatic hydrocarbon radicals and bromine-substituted saturated aliphatic hydrocarbon radicals, and in which $n$ is a whole number from 0 to about 2,000, which are produced by polymerizing a compound of the formula

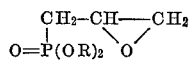

in the presence of at least a catalytically effective amount of a Friedel-Crafts catalyst at a temperature between 0 and 150° C.

---

According to the invention, there is provided a method for the production of a diol of the formula:

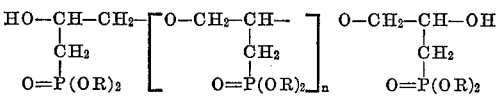 I in which R is selected from the group consisting of saturated aliphatic hydrocarbon radicals, chlorine-substituted saturated aliphatic hydrocarbon radicals and bromine-substituted saturated aliphatic hydrocarbon radicals, and in which $n$ is a whole number from 0 to about 2,000, wherein a compound of the formula:

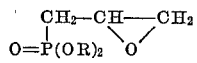 III (wherein R is as defined above) is polymerised in the presence of at least a catalytically effective amount of a Friedel-Crafts catalyst at a temperature in the range 0 to 150° C.

There is also provided according to the invention a diol of the formula:

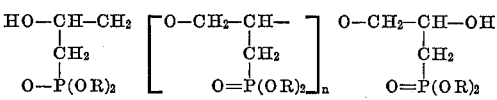 I in which R and $n$ are as defined above.

It should, of course, be understood that the general Formula I given above is intended to cover the case where one or more of the diol units is or are reversed.

As the starting material for carrying out the process according to the invention one may use all epoxy esters of the general Formula III. These are obtained for example by reacting appropriate esters of the phosphorous acid with epichloro or epibromohydrin. The alcoholic component of these esters of the phosphorous acid should consist of radicals of saturated aliphatic alcohols. For mass production it is preferred to use esters of the phosphorous acid whose alcoholic radicals contain 1 to 6 carbon atoms per radical, for example trimethyl, triethyl, tripropyl, triisopropyl, tributyl or triisobutyl phosphite. But one may also use esters of the phosphorous acid having radicals which are richer in carbon, for example trioctyl, trinonyl or tridecyl phosphite as the starting material. It is possible for some of the hydrogen atoms contained in the alcoholic components of these esters of phosphorous acid to be replaced with halogen atoms, especially chlorine and/or bromine atoms. Such esters are, for example, tris-(bromoethyl)-phosphite, tris-(chloroethyl)-phosphite, tris-(dibromopropyl)-phosphite.

By reacting with possibly excess quantities of epihalogenohydrins, especially epibromohydrin, phosphorus-containing epoxy compounds of the general Formula III and a corresponding amount of alkyl halide are obtained from these compounds at elevated temperatures by known methods. In Formula III, R represents like or different saturated aliphatic radicals in which hydrogen atoms may be partially replaced with chlorine and/or bromine atoms.

To such epoxy alkyl phosphonic acid dialkyl esters of the general Formula III that can be made in this manner, there are then added small quantities (at least a catalytically effective amount) of catalysts, such as aluminium trichloride or tribromide or boron trifluoride or trichloride or titanium tetrachloride or zinc chloride or their etherates, especially boron trifluoride etherates, which are also effective in the synthesis of benzene homologues by the Friedel-Crafts method. The quantity of added catalyst substantially determines the size of the number $n$ in the general Formula I. The smaller the number $n$ is to be, the larger the quantity of catalyst. This at the same time determines the OH number of the Formula I compound produced according to the invention, the OH number being increased as the amount of catalyst increases and thus the value of the number $n$ decreases. In general, it has been found that a phosphorus-containing diol of the general Formula I is produced with an OH number of 60 to 70 if 100 parts by weight of the compound of the general Formula III used as starting material is mixed with one part by weight of catalyst, whilst the OH number of the diol of the general Formula I amounts to about 70 to 85 if 100 parts by weight of the compounds of the general Formula III are used with 2 parts by weight of catalyst.

It will be appreciated that, with this process, there is no need to add any diol corresponding to the epoxide III in order to start the reaction.

The formation of the desired diol of the general Formula I takes place after mixing the catalyst with the epoxy alkyl phosphonic acid dialkyl ester of the general Formula III at temperatures of 0 to 150° C., the speed of reaction being greater as the temperature increases. Having regard to the obtainable yield and the uniformity of the molecular structure of the desired diol of the general Formula I, the reaction mixture is preferably kept at temperatures between 50 and 120° C. during the reaction.

After the reaction is completed there is added to the reaction products, which may have cooled, a quantity of alkali hydroxides (for example sodium or potassium hydroxides) or amines (for example triethyl amine, pyridine, dibutyl amine) in alcoholic solution and in an amount sufficient to destroy the amount of catalyst that was employed. Normally, about 2 to 10 mole of alkali hydroxide or 2 to 10 mol of amine are sufficient per mol of catalyst.

Subsequently, if necessary after filtration, the volatile components are removed from the reaction products by distillation, preferably under vacuum, so that the desired diol of the general Formula I is left as the distillation residue. These diols are mostly viscous liquids whose viscosity increases with a decrease in OH number. Diols of the general Formula I made in this manner are sufficiently pure for use as flame protection components in plastics. For applications that call for higher purity requirements the diols of the general Formula I may be dissolved in suitable organic solvents such as tetrahydrofurane, dioxane, ether, etc. The resulting solutions are then treated with activated carbon and filtered.

The solvent is then distilled out of the filtrate, preferably under vacuum. The activated carbon treatment can of course be carried out several times.

EXAMPLE 155 parts by weight of epoxy propyl phosphonic acid diethyl ester are reacted with 5 parts by weight of boron trifluoride etherate and the resulting mixture is kept for 3 hours at a temperature of 80° C. After cooling, the reaction products are mixed with 61.5 parts by weight of a 10% solution of hydroxide in methanol. Subsequently, the readily volatile components are distilled off the resultant mixture under vacuum. As residue there remain 152.5 parts by weight of a phosphorus-containing diol of the general Formula I with 16.3% by weight of phosphorus, an OH number of 80, an an acid number of 0 and a molecular weight of 864 (determined according to the method of freezing point reduction in benzene).

I claim:
1. A phosphorus-containing diol of the formula:

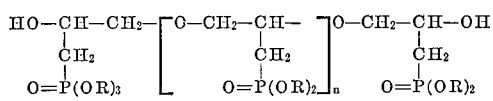

in which R is selected from the group consisting of saturated aliphatic hydrocarbon radicals, chlorine-substituted saturated aliphatic hydrocarbon radicals and bromine-substituted saturated aliphatic hydrocarbon radicals, in which the hydrocarbon radical has a maximum of ten carbon atoms and $n$ is a whole number from about 3 to about 8, said diol having a hydroxyl number of about 60 to about 85.

2. The diol of claim 1 in which R is ethyl and the hydroxyl number is about 75 to 85.

3. A method of polymerization for the production of a diol of the formula:

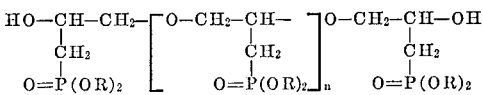

in which R is selected from the group consisting of saturated aliphatic hydrocarbon radicals, chlorine-substituted saturated aliphatic hydrocarbon radicals and bromine-substituted saturated aliphatic hydrocarbon radicals, in which the hydrocarbon radical has a maximum of ten carbon atoms, in which $n$ is a whole number and said diol has a hydroxyl number of about 60 to about 85, wherein a compound of the formula:

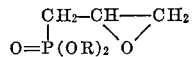

(wherein R is as defined above) is polymerized in the presence of a Friedel-Crafts catalyst at a temperature in the range 0 to 150° C., destroying the catalyst with an alcoholic alkaline solution, and distilling off the volatile components from the reaction product obtained so that the desired diol is left as a distillation residue.

4. The method of claim 3, wherein the reaction temperature is from 50 to 120° C.

5. The method of claim 3 in which the alcoholic alkaline solution is an alkali hydroxide solution.

References Cited

UNITED STATES PATENTS

| 2,856,369 | 10/1958 | Smith et al. | 260—2 |
| 2,939,849 | 6/1960 | Frick et al. | 260—968 |
| 3,317,638 | 5/1967 | Hartman et al. | 260—968 |

OTHER REFERENCES

Gaylord: Polyethers, Part I (1963), Interscience Publishers, New York, p. 111.

CHARLES B. PARKER, Primary Examiner

A. H. SUTTO, Assistant Examiner

U.S. Cl. X.R.

260—45.95, 348, 968